US012370951B1

(12) United States Patent
Sherwood et al.

(10) Patent No.: US 12,370,951 B1
(45) Date of Patent: Jul. 29, 2025

(54) SYSTEM, METHOD AND APPARATUS FOR PROVIDING ASSET IR ILLUMINATION FOR A CAMERA CARGO SENSOR

(71) Applicant: ORBCOMM, INC., Rochelle Park, NJ (US)

(72) Inventors: Erik Sherwood, Ottawa (CA); Brian Hart, Ottawa (CA); Ronald Straz, Sterling, VA (US); Phil Lafleur, Ottawa (CA)

(73) Assignee: ORBCOMM, Inc., Rochelle Park, NJ (US)

( * ) Notice: Subject to any disclaimer, the term of this patent is extended or adjusted under 35 U.S.C. 154(b) by 0 days.

(21) Appl. No.: 17/580,511

(22) Filed: Jan. 20, 2022

Related U.S. Application Data

(60) Provisional application No. 63/139,749, filed on Jan. 20, 2021.

(51) Int. Cl.
*B60R 1/29* (2022.01)
*G02B 13/06* (2006.01)

(52) U.S. Cl.
CPC ............... *B60R 1/29* (2022.01); *G02B 13/06* (2013.01); *B60R 2300/103* (2013.01); *B60R 2300/8006* (2013.01)

(58) Field of Classification Search
None
See application file for complete search history.

(56) References Cited

U.S. PATENT DOCUMENTS

| | | | |
|---|---|---|---|
| 2007/0223792 A1* | 9/2007 | Morimoto | G06V 40/1312 382/126 |
| 2013/0155233 A1* | 6/2013 | Dahlqvist | H04N 23/56 348/143 |
| 2016/0286169 A1* | 9/2016 | Sannala | G08B 25/10 |
| 2019/0064534 A1* | 2/2019 | Chou | G02B 3/08 |
| 2019/0089872 A1* | 3/2019 | Rukes | G08B 13/19626 |
| 2021/0294015 A1* | 9/2021 | Yin | G02B 6/0051 |
| 2021/0294081 A1* | 9/2021 | Wang | G03B 17/02 |

* cited by examiner

*Primary Examiner* — Rebecca A Volentine

(57) ABSTRACT

The present invention provides a cargo imaging device which allows for asset IR illumination and monitoring of the interior of a closed cargo container. According to a first preferred embodiment, the imaging device of the present invention includes a housing which encloses a central lens. The central lens is preferably located between an upper IR light guide and a lower IR light guide. Preferably, the central lens may be formed as a fish-eye lens. Still further, the imaging device of the present invention may preferably further include a BLE transmitter and antenna arrangement which may include an inverted-F BLE antenna and a BLE booster ring surrounding the lens to assist the inverted-F BLE antenna to transmit and receive signals between the cargo interior and the BLE antenna.

13 Claims, 19 Drawing Sheets

SYSTEM, METHOD AND APPARATUS FOR PROVIDING ASSET IR ILLUMINATION FOR A CAMERA CARGO SENSOR

RELATED APPLICATIONS

The present application claims priority to U.S. Provisional Application No. 63/139,749 filed Jan. 20, 2021.

BACKGROUND OF THE PRESENT INVENTION

1. Field of the Invention

The present invention relates to a system, method, and apparatus for providing asset IR illumination for a camera cargo sensor.

2. Description of Related Art

Modern telematics systems allow companies to track shipping containers in real-time, through virtually every point of the distribution system. However, the vast majority of container tracking is limited to the outside of the container. This is an important limitation given that the status of the cargo and the environment inside of each container is the most critical concern for shippers and their customers.

Shipping containers and trailers vary in size, but most commonly are 8' wide, 8' 6" high and extend to lengths over 40'. These dimensions make it difficult to image the entire container interior without deploying several devices. Another challenge to imaging within a shipping container is the low light environment. This is a particular issue for wide-angle lenses which perform poorly without sufficient light.

Another issue with imaging within shipping containers is the need to accommodate cargo which changes the sight lines for any installed cameras. Cargo containers also require the use of very thin device profiles in order to not protrude too far beyond ceilings and walls where the devices would get struck during loading or un-loading. Each of these factors combine to make active monitoring of container interiors difficult and unreliable.

One solution in the prior art relies on wall mounted cameras and employs straight light pipes to illuminate the container interior. This type of solution has benefits but it still often fails at providing images of an entire cargo container. Additionally, these types of systems are prone to having the cameras blocked by large amounts of stacked cargo. To overcome the limitations of the prior art, a novel device is needed which allows for rapid and reliable imaging of the full shipping container interior in a small package.

Another issue with camera installations is that details about the installation cannot always be known in advance. To minimize business disruption, installations for large fleets are often opportunistic, on assets that are not currently in use. Transportation fleets often consist of many asset types and models/sub-types, often with different features. For example, a fleet might have some trailer of a given make and model, but some with roll doors and some with swing doors. This can become a significant obstacle requiring multiple models of cargo cameras and installation kits as well as extensive logistical coordination between installation and product delivery, precluding the preferred opportunistic installation approach.

SUMMARY OF THE PRESENT INVENTION

To address the shortcomings presented in the prior art, the present invention provides a cargo imaging device which allows for asset IR illumination and monitoring within a closed cargo container. According to a first preferred embodiment, the imaging device of the present invention may preferably include a housing which encloses a central lens. The central lens is preferably located between an upper IR light guide and a lower IR light guide. The cargo imaging device preferably may include an upper IR light source which is positioned to project light into the upper IR light guide and a lower IR light source which is positioned to project light into the lower IR light guide.

According to a further preferred embodiment, the central lens may be formed as a fish-eye lens. Still further, the lens and the IR light guides may preferably be encircled by a sealing flange which may be formed of foam tape or the like such as VHB tape.

According to a still further preferred embodiment, the imaging device of the present invention may preferably further include a BLE transmitter and antenna arrangement which may include an inverted-F BLE antenna and a BLE booster ring surrounding the lens to assist the inverted-F BLE antenna transmit and receive signals between the cargo interior and the BLE antenna.

DESCRIPTION OF THE PREFERRED EMBODIMENTS

Figure 1:
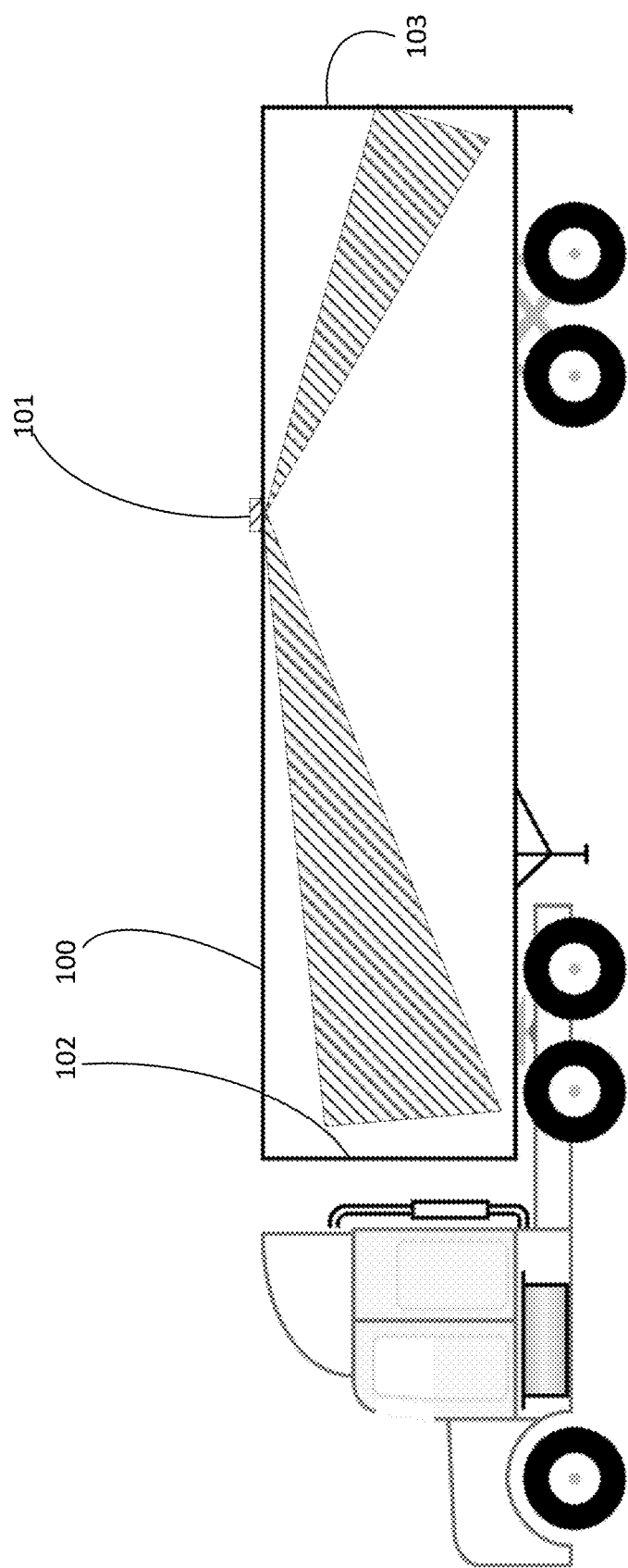
FIG. 1 is a schematic representation of a cargo container and imaging device in accordance with the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The following discussion addresses a number of preferred embodiments and applications of the present invention. It is to be understood that other embodiments may be utilized, and changes may be made without departing from the scope of the present invention.

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be listed in the specification and all such embodiments are intended to be included within the scope of that term or terms. As used throughout this application, the word "may" is used in a permissive sense (i.e., meaning "having the potential to'"), rather than the mandatory sense (i.e. meaning "must").

The communication elements of the present invention as discussed below may include any of a mix modulators, demodulators and/or receivers for a range of protocols including (but not limited to): Bluetooth, Bluetooth Low Energy ("BLE"), ZigBee, Thread, Wi-Fi (802.11xxx), 2G-5G, LTE, NFC, RFID, and DigiMesh protocols. Further, the communication elements may be wired, wireless, or combinations thereof and may include components such as modems, gateways, switches, routers, hubs, access points, repeaters, towers, and the like whether illustrated or omitted. Communication and control systems of the present invention may also include signal or data transmitting and receiving circuits, such as antennas, amplifiers, filters, mixers, oscillators, digital signal processors (DSPs), and the like whether illustrated or omitted. The controller and/or controlling elements as discussed below may also include additional wireless transceivers and related elements such as: broadband and/or narrowband wireless transceivers, a satellite transceiver, and/or a GPS/GNSS receiver or the like.

As referred to above, all communications of the present invention may be designed to be duplex or simplex in nature. Further, as needs require, the processes for transmitting data to and from the present invention may be designed to be push or pull in nature. Still further, each feature of the present invention may be made to be remotely activated and accessed from distant monitoring stations. Accordingly, data may be uploaded to and downloaded from the present invention as needed.

Referring now to FIGS. 1-19, aspects of an exemplary imaging and data processing system in accordance with the present invention shall now be discussed. As should be understood, the systems disclosed in FIGS. 1-19 are exemplary systems onto which the features of the present invention may be integrated. Accordingly, the figures are intended to be illustrative and any of a variety of systems may be used with the present invention without limitation.

FIG. 1 is a schematic representation of an exemplary cargo container 101 and imaging device 100 in accordance with the present invention. Although the present invention shall be shown and discussed with respect to a shipping container, the present invention may be used to monitor the contents of any container, trailer or other closed spaces having limited access and low-light. As shown in FIG. 1, the imaging device 100 of the present invention may preferably be a wall and/or ceiling mounted cargo camera 100 with a fish-eye lens capable of imaging the entire container space 101 from the front/nose 102, to the rear/backend 103. An exemplary cargo camera 100 for use with the present invention shall be discussed in detail below.

Figure 2:
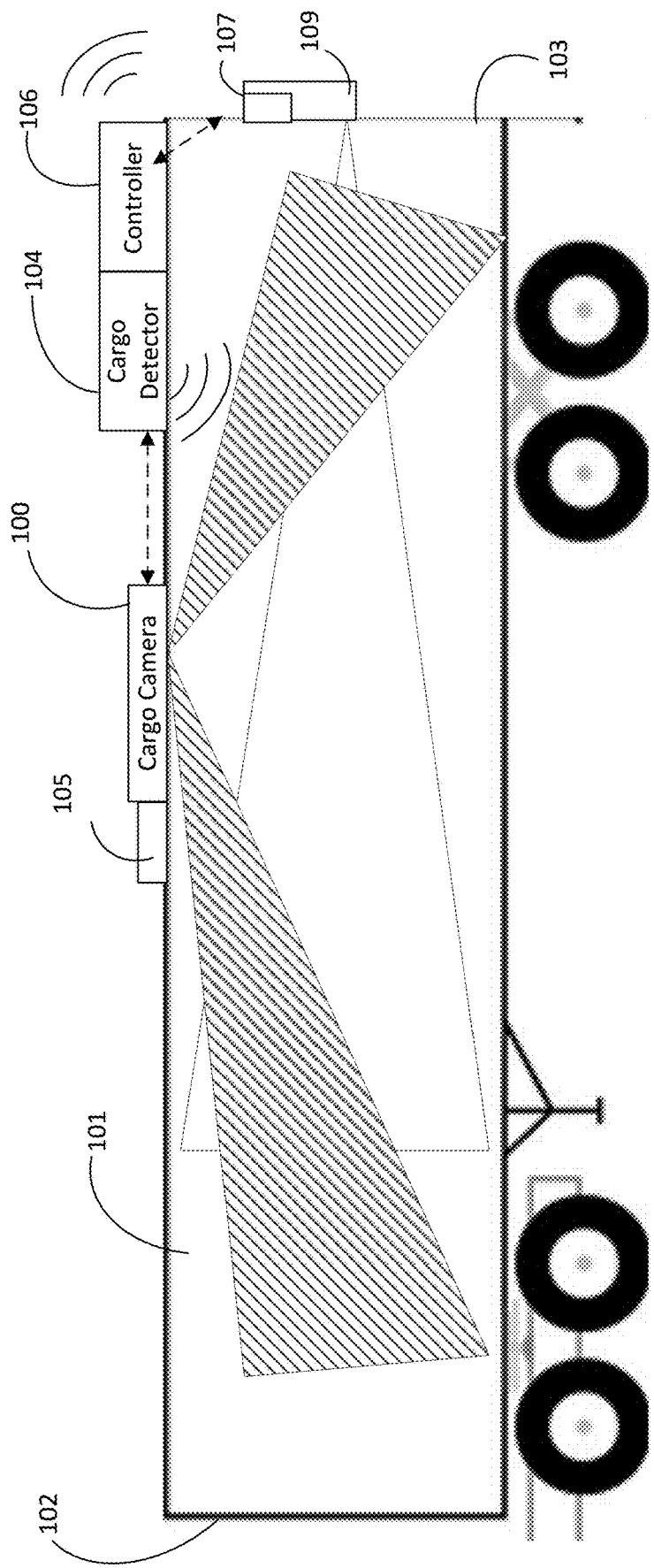
FIG. 2 is a schematic representation of a first alternative embodiment of the present invention.

Referring now to FIG. 2, a schematic representation of a first alternative embodiment of the present invention shall now be discussed. As shown in FIG. 2, the cargo camera 100 of the present invention may be employed by itself to provide images of a given container interior 101. Alternatively, the system of the present invention may also include more than one camera. For example, a second camera 109 may be used to provide additional imaging data. According to a further preferred embodiment, the imaging devices 100, 109 may each include fish-eye lenses (as discussed further below) and may be installed in supporting locations such as the ceiling and nose of the container.

According to further aspects of the present invention, a central controller 106 may be employed to control and link multiple cameras 100, 109 together for imaging. The central controller 106 may also link to other types of cargo detectors 104 and other monitoring devices to provide additional monitoring data. According to a preferred embodiment, the present invention may include a controller 106 and a detector 104 such as disclosed and discussed within U.S. Provisional Application No. 63/084,660 which is hereby incorporated by reference in its entirety. Alternatively, the functions of the controller 106 may be included within one or more of the separate cameras 100, 109.

According to a further preferred embodiment, one or more cameras 100, 109 of the present invention may include photosensors 105, 107 and may further be linked together (either directly or through the controller) to provide supplementary light (e.g., IR or visible light as discussed further below) in a coordinated fashion. For example, when one camera is triggered to image the container and to provide an IR flash, another linked camera may preferably be triggered to provide a supplementary IR flash at the same time to provide additional lighting for images. The linked camera may also be triggered to record an image at the same time along with the provided IR flash. Still further, the cargo detector 104 may also preferably be linked/coordinated to provide additional sensing data (i.e., via an ultrasonic, sound, or motion sensor) to be detected in sync with the returned IR or other light wave data received by the camera sources.

According to a further preferred embodiment, the cargo detector 104 may include any of a variety of sensors (i.e., temperature, light, ultrasonic, sound, motion) which may trigger one or more of the cameras 100, 109 to conduct imaging either together or individually. As discussed further below, each of the separate, individual system elements may be connected via wired (e.g., RS-485) or wireless (e.g., Bluetooth) methods. According to a further preferred embodiment, one or more of the linked photosensors 105, 107 may trigger the camera functions of one or more cameras 100, 109 or other sensing devices (e.g., cargo detector 104) to execute. Similarly, the photosensors 105, 107 may trigger one or more functions of the controller 106 to execute. For example, a photosensor 105, 107 may detect an event via a change in light (e.g., door open, door close, forklift headlights) and trigger the controller 106 to create and transmit a report of the detected event or to execute another function.

According to a further preferred embodiment, the controller 106 and/or one or more of the cameras 100, 109 may also be linked to and receive data from outside sources such as a vehicle CAN bus, a driver telematics system, remote servers, and the like. Such exchanged data between the controller and the outside systems may also trigger events between systems. For example, where a photosensor 105, 107 detects a change in light indicating a door opening, the system of the present invention may initiate a warning to the driver indicating the door opening event. In another example, a photosensor 105, 107 may detect a change in the light environment of the shipping container (e.g., such as a change in light levels which may indicate a shift in cargo.) Such a detected change in light levels may be a measured change in the background light levels within the container or a measured change in the light levels or light patterns produced by one or more IR flashes. In response to such a detected event, the system may trigger events such as those discussed above.

Figure 3A:
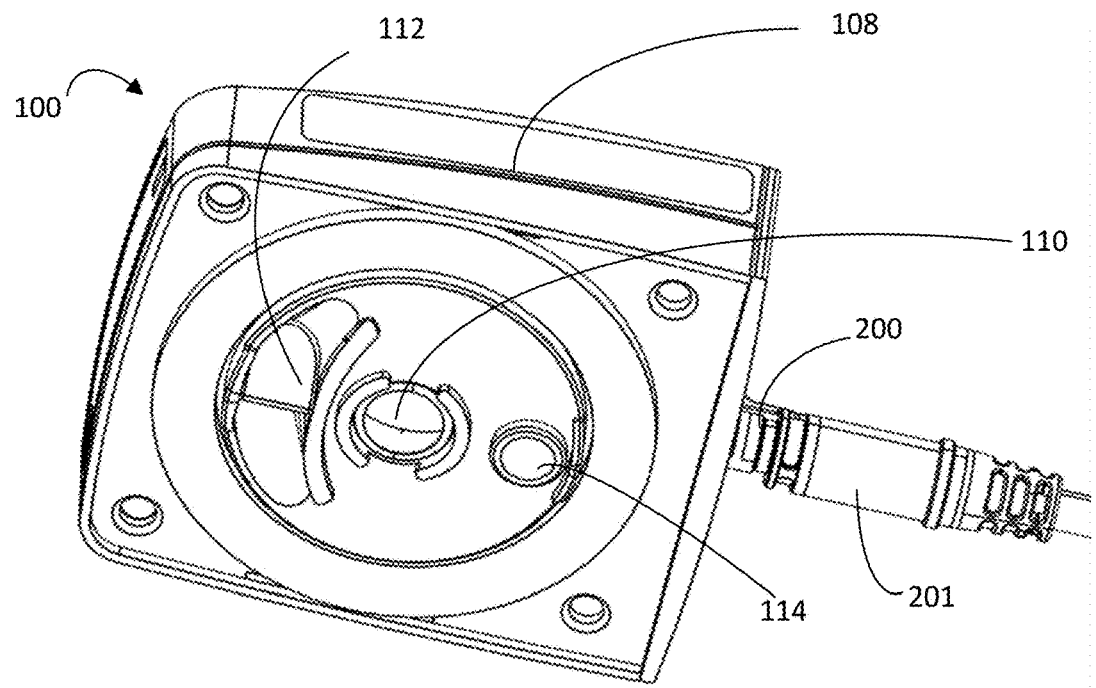
FIG. 3A is a first perspective view of a first exemplary container imaging device in accordance with the present invention.
Figure 3B:
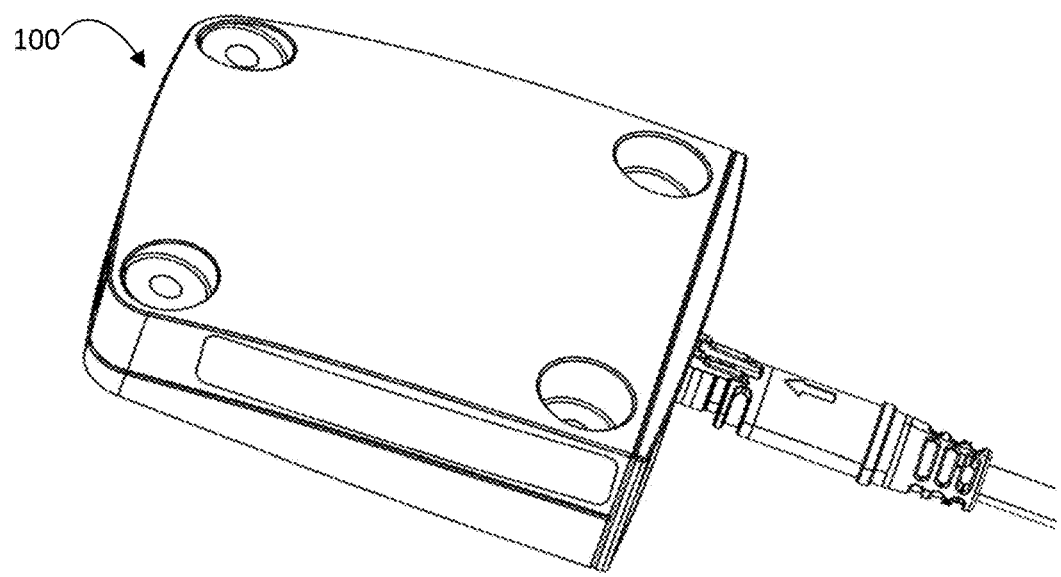
FIG. 3B is a second perspective view of the first exemplary container imaging device in accordance with the present invention.

With reference now to FIGS. 3A and 3B, a first exemplary embodiment of an exemplary cargo imaging device 100 of the present invention shall now be discussed. As shown in FIG. 3A, a preferred imaging device 100 of the present invention may preferably include a housing 108 enclosing a lens 110, an upper IR light guide 112, and a lower light guide 114. A connector 200 is shown provided to accommodate multiple installation scenarios by connecting either to a cable connector 201 or to a connected device 100 as discussed further below. FIG. 3B provides an image of the back of the imaging device 100.

Figure 4:
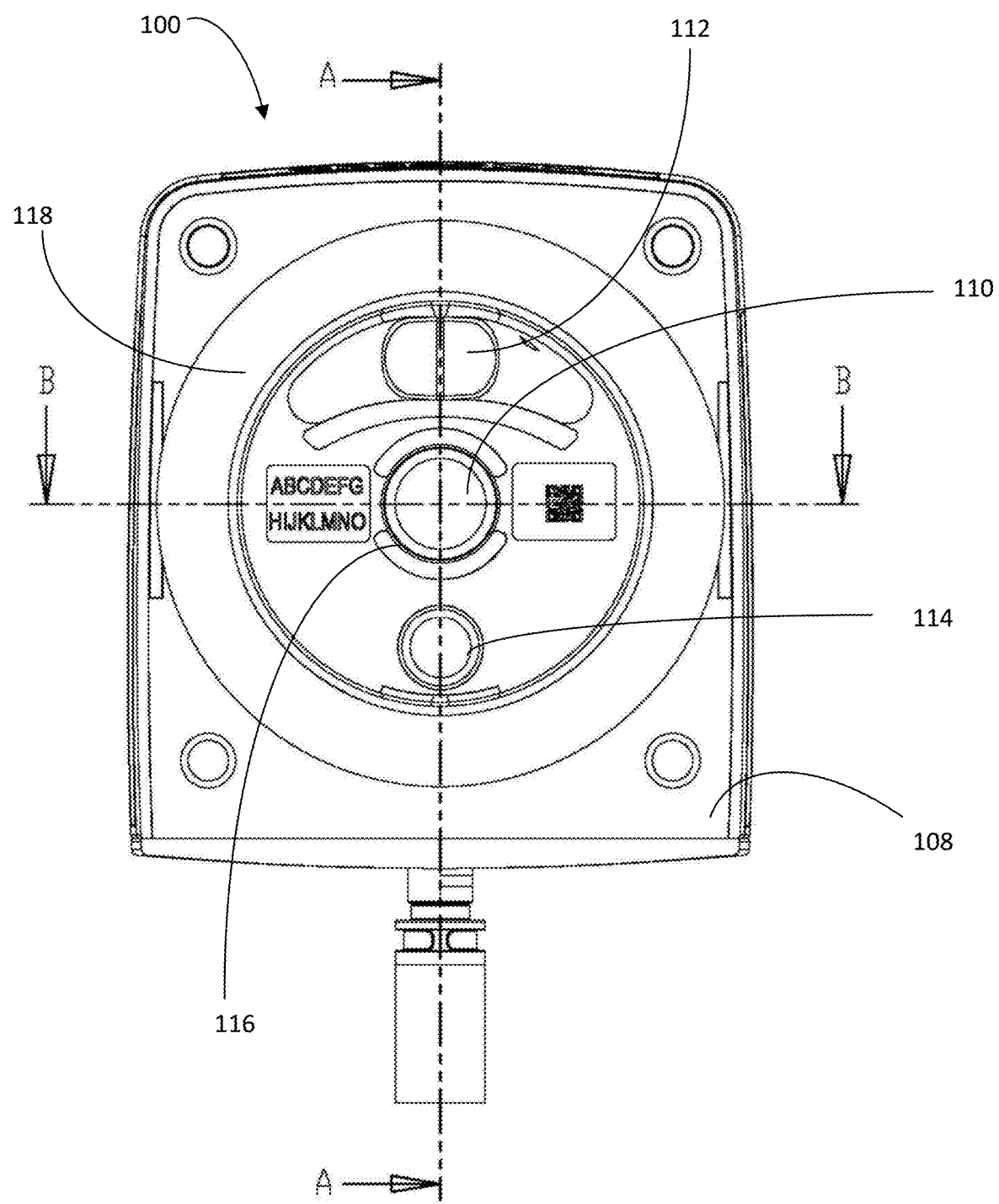
FIG. 4 is a plan view of the underside of the first exemplary container imaging device shown in FIGS. 3A and 3B.
Figure 5:
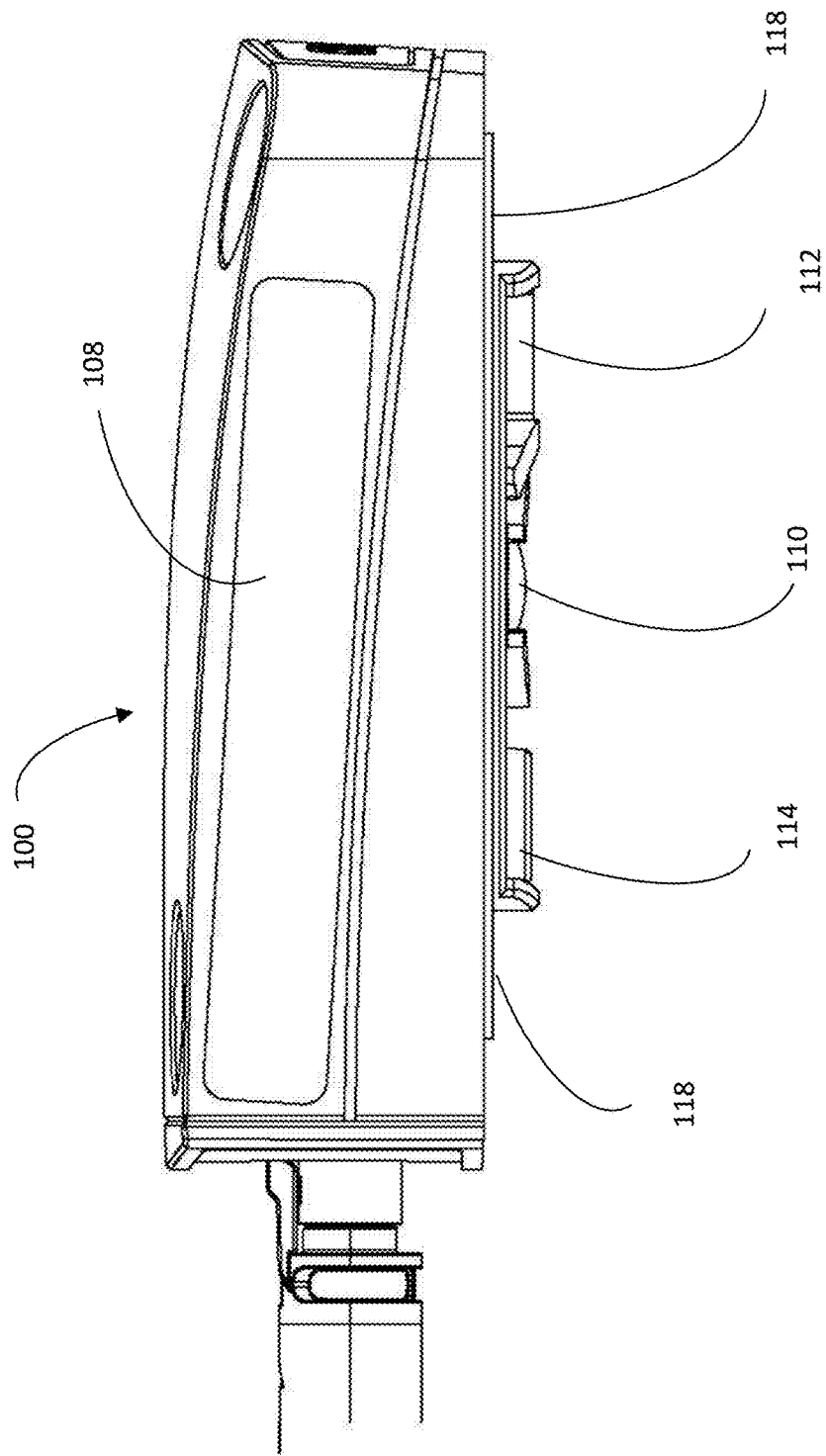
FIG. 5 is a side view of the first exemplary container imaging device shown in FIG. 4.

Referring now to FIG. 4, a more detailed view of the underside of the exemplary imaging device 100 is provided. As shown, the lens 110 may preferably be a fish-eye lens or the like and may preferably be located at or near the center of the imaging device 100. The lens 110 and the IR light guides 112, 114 preferably may be encircled by a sealing flange 118. According to a preferred embodiment, the sealing flange 118 may preferably be formed of a high-strength, double-sided acrylic foam tape or the like such as VHB tape. The imaging device 100 may preferably further include a BLE transmitter and antenna arrangement as discussed further below. The present invention may also include a BLE booster ring 116 surrounding the lens 110 to assist the BLE antenna. FIG. 5 provides a side view of the imaging device 100.

Figure 6:
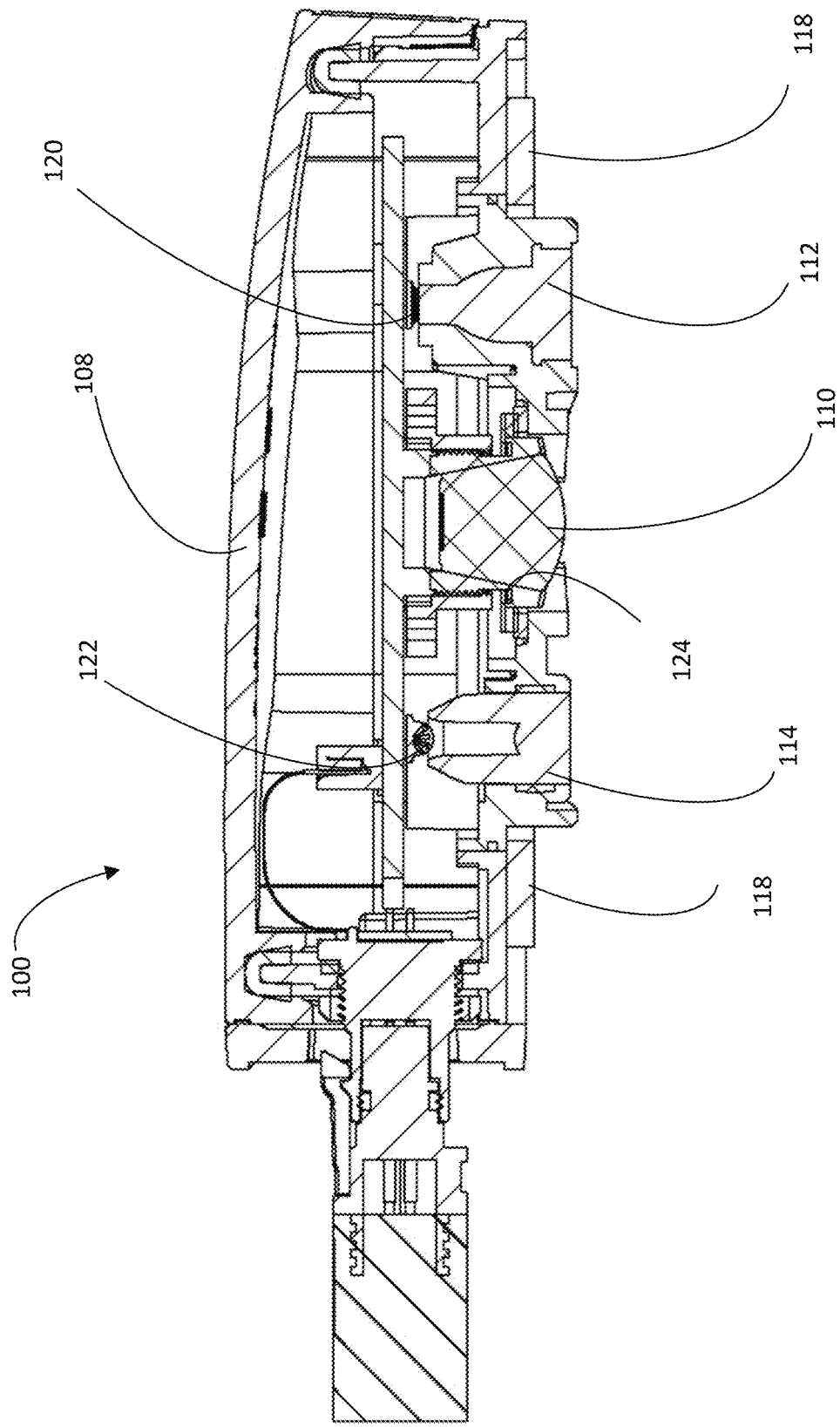
FIG. 6 is a cross-sectional view of the imaging device shown in FIG. 4 taken along the line A-A.
Figure 7:
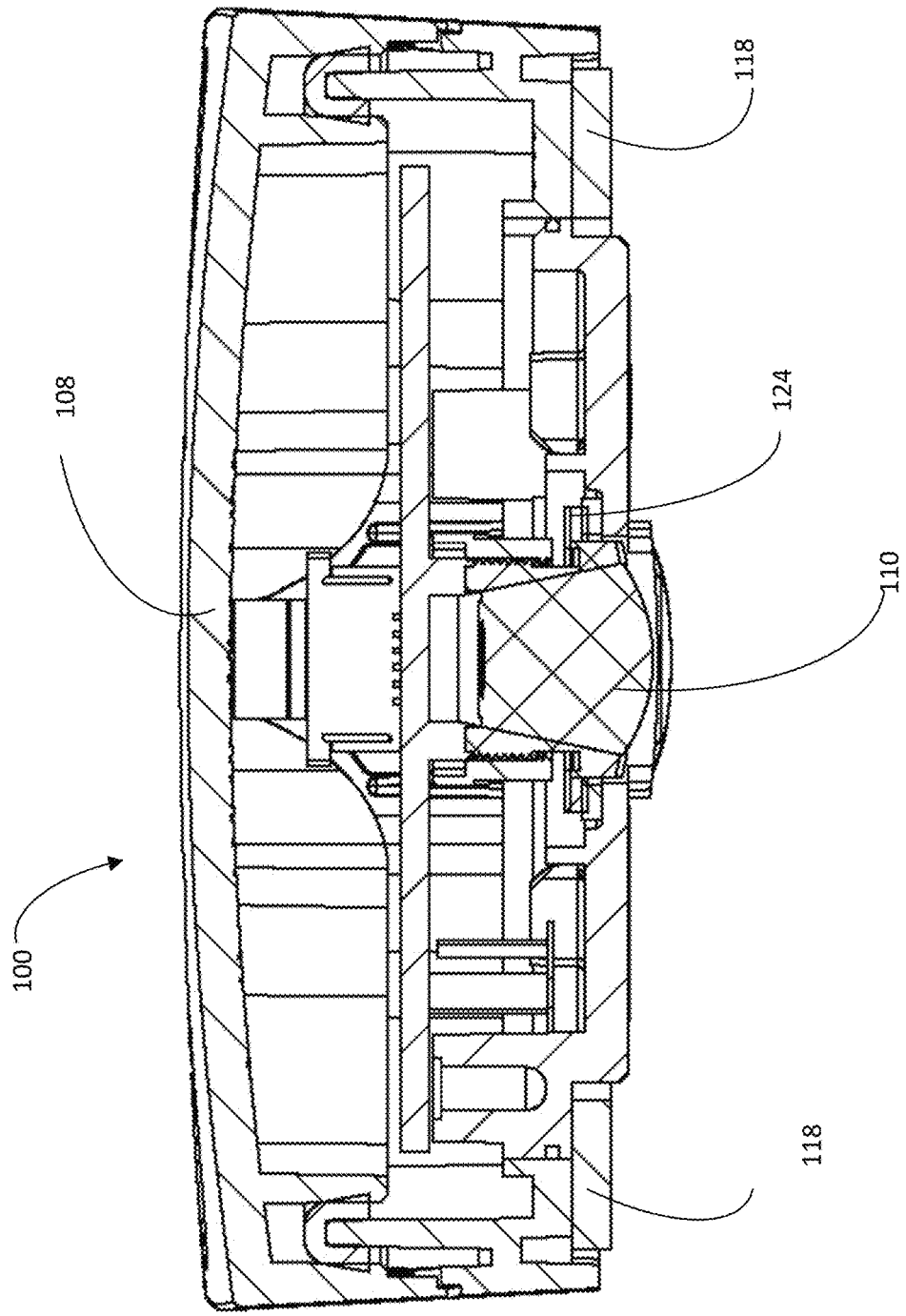
FIG. 7 is a cross-sectional view of the imaging device shown in FIG. 4 taken along the line B-B.
Figure 10:
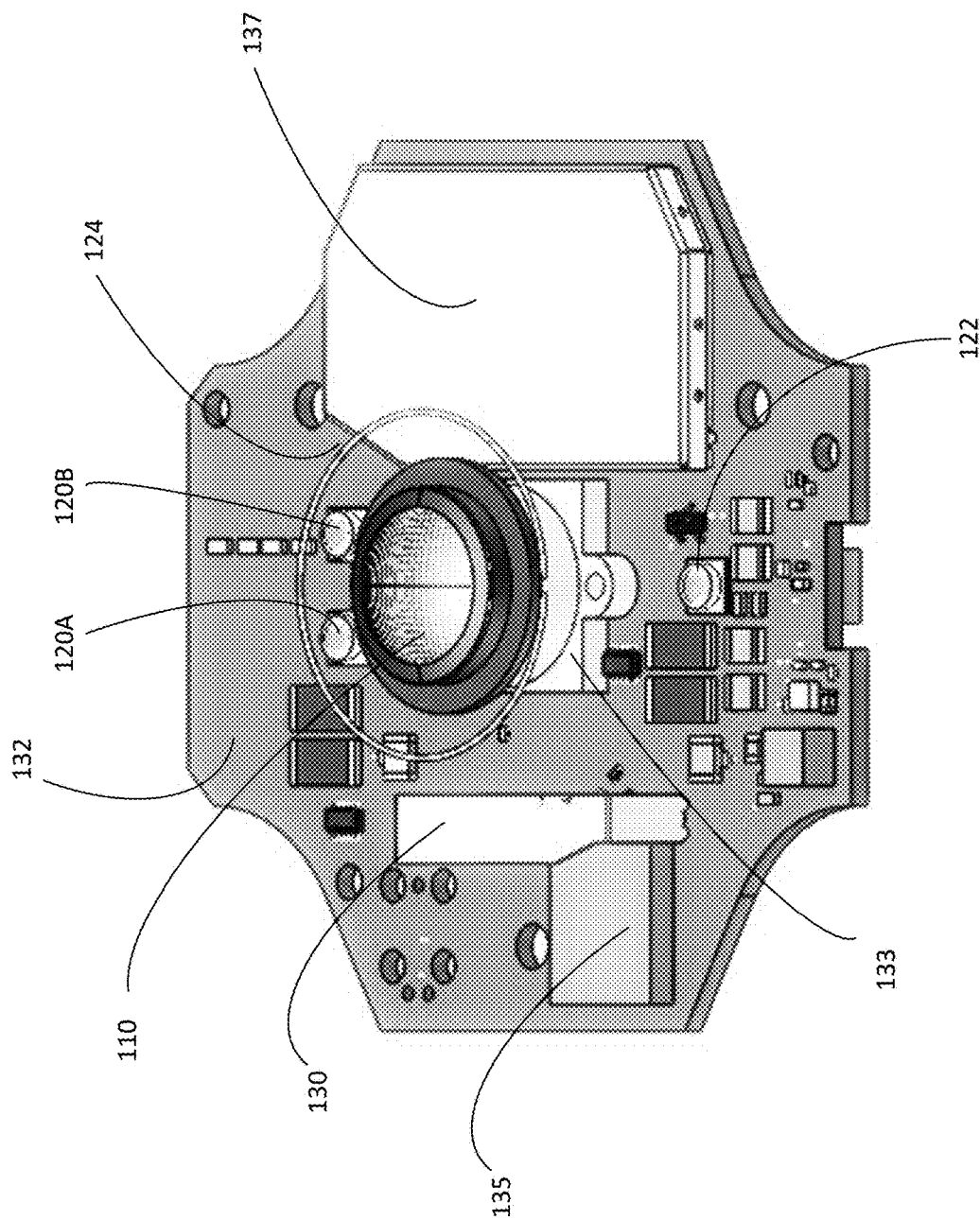
FIG. 10 is a perspective view of an exemplary circuit board in accordance with the present invention.

With reference now to FIG. 6, a cross-sectional view of the imaging device shown in FIG. 4 taken along the line A-A shall now be discussed. As shown in FIG. 6, the imaging device 100 preferably includes IR LED light sources 120, 122 which are positioned to project light through respective light guides 112 and 114. As discussed further below, at least one IR LED light source 120 may be formed of multiple IR LED lights 120A, 120B (as shown in FIG. 10) which may project light into different light channels of a given light guide 112 (as discussed further below). The BLE booster ring 124 may preferably surround the lens 110 and act to preferentially direct transmission and reception of BLE signals through the opening in the roof or wall and to allow communications to and from the interior of a given container. FIG. 7 provides a further cross-sectional view of the imaging device shown in FIG. 4 taken along the line B-B.

Figure 8:
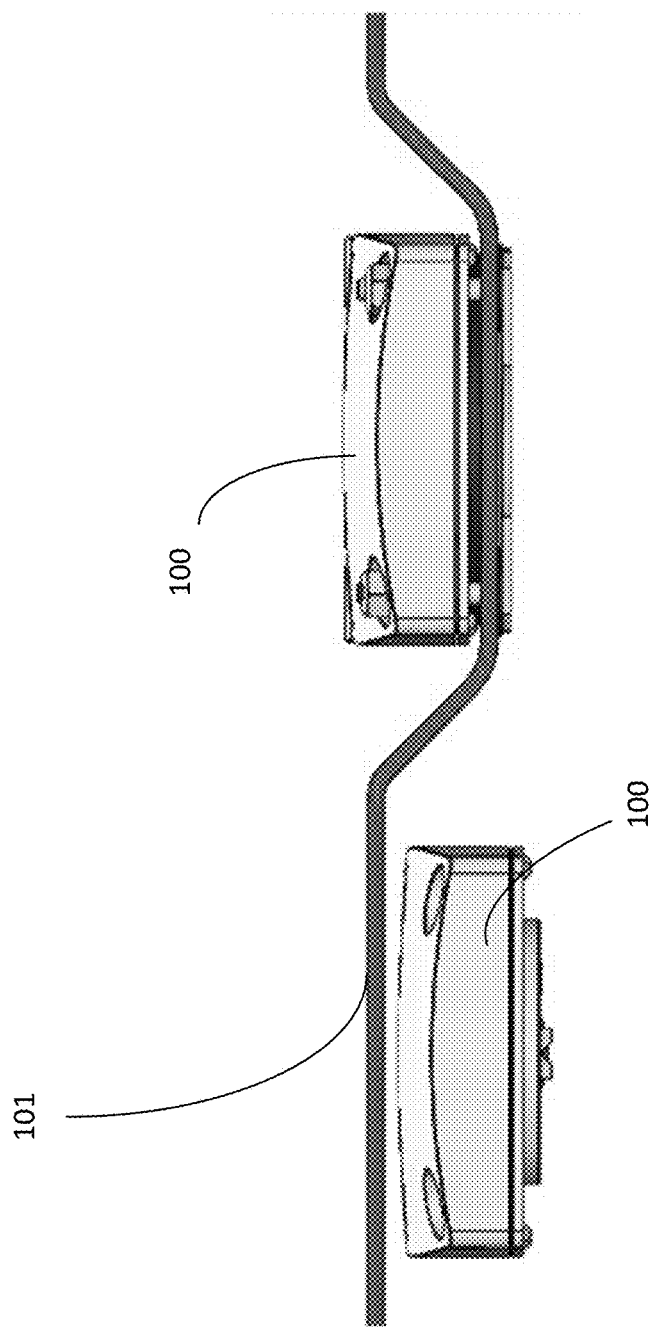
FIG. 8 is a schematic illustrating the installment positions of an exemplary imaging device in accordance with the present invention.

With reference now to FIG. 8, the imaging device 100 of the present invention may preferably be sized and dimensioned to fit within the corrugation of a standard shipping container. As shown, the imaging device 100 may be attached to either side of a given corrugation surface 101. Furthermore, depending on the installation requirements, the imaging device 100 may be installed external or internal to the container. In the case of the external installation, compact stud brackets (e.g., small enough to pass through the same sized hole as required for the imaging function) may be used in order to minimize the need to alter or cut into the asset. For external installations, the imaging device 100 may preferably be paired with a solar module (301, 302) to form a fully wireless configuration as discussed with reference to FIG. 15 below.

In the case of internal installation, low profile roof-mount bracketry may preferably be used. For such installations, a cable may be provided to power the imaging device 100, either from a remote solar module 301 or another device 300 (shown in FIG. 15) as discussed further below. All of these configurations may be based on the same imaging device 100, with different accessories for different installations.

Figure 9:
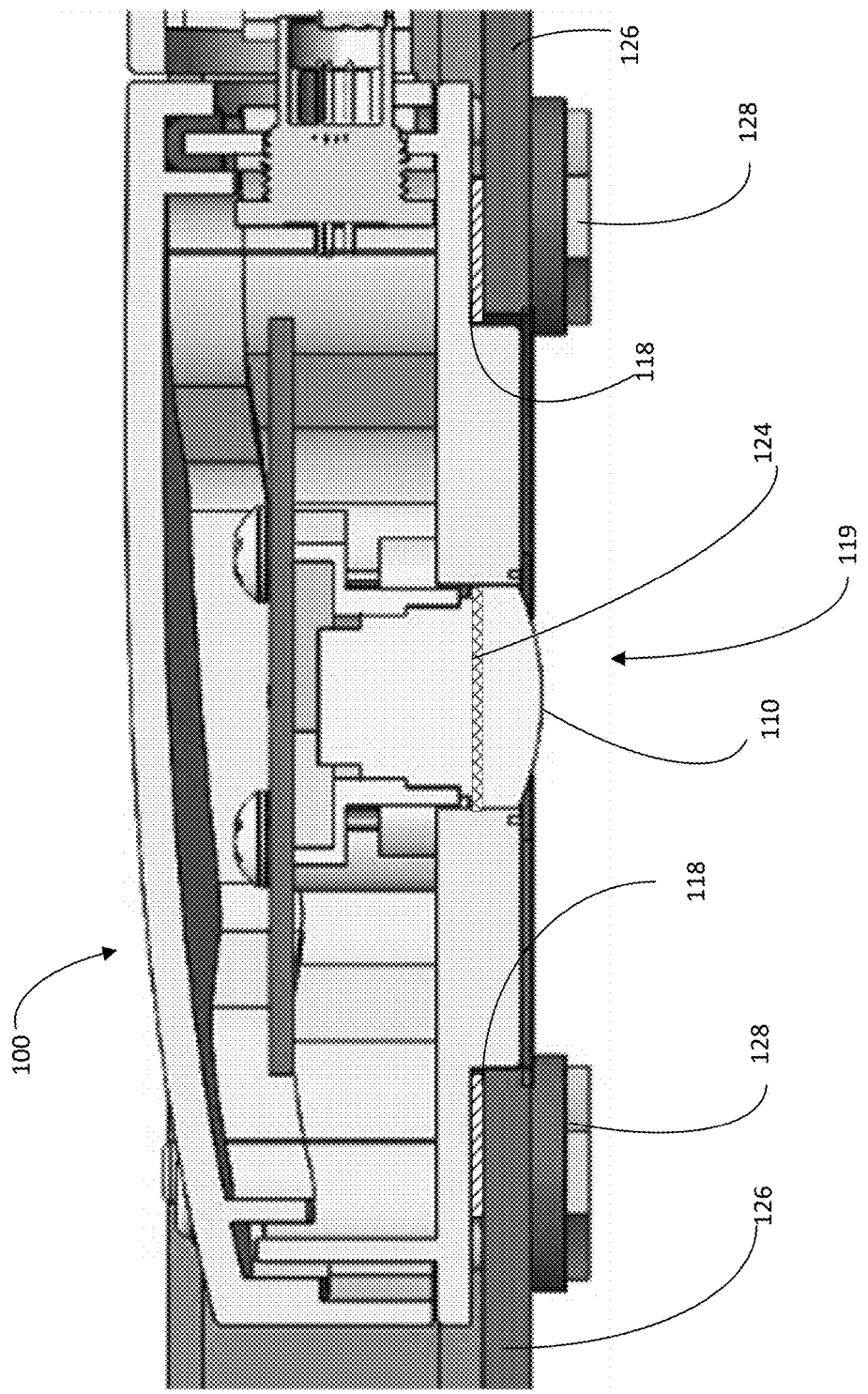
FIG. 9 is a cross-sectional view of an imaging device of the present invention attached to a container wall.

As shown in FIG. 9, the imaging device 100 of the present invention may preferably be attached to a container surface 126 with access to an opening 119 sufficient to accommodate at a minimum the light guides 112, 114 and lens 110. According to a preferred embodiment, the opening 119 will preferably correspond to the diameter of the sealing flange 118 so that a weather tight seal can be established. As shown in FIG. 9, the imaging device 100 may preferably be secured to a container surface 126 using mounting brackets 128 which may be screwed or otherwise attached to the container service 126 and the imaging device 100. Preferably, the lens 110 may protrude through the corrugated surface 126 but not beyond the attaching screws or mounting brackets so that the lens 110 is protected against impacts and scratches.

With reference now to FIG. 10, an exemplary circuit board 132 incorporating aspects of the present invention shall be discussed. As shown in FIG. 10, the imaging device 100 of the present invention may preferably include a lens 110 which directs imaging light to a CMOS sensor 133 or the like. Preferably, the lens 110 may be a fish-eye lens with a field of view in the range of 170-230° and one or more filters to exclude unwanted wavelengths. Such filters may include IR only, visible +IR or any other combination of filters. According to a preferred embodiment, the lens 110 may have a field of view in the range of 210° and may include a dual band pass filter which may allow only a select band of IR and visible light (e.g., 850 um+/−50 um and visible light).

As shown in FIG. 10, the exemplary imaging device 100 of the present invention may preferably include a three IR LED configuration. In this configuration, each IR LED may be directed into one or more light guides which may direct the IR LED light in different directions. According to a preferred embodiment, and as discussed further below, one IR LED may be directed left, one to the right, and one forward. Preferably, each IR LED may preferably be individually controlled by a controller 137 to provide increments of power such as full power, half power, or OFF. These illumination settings may preferably be tracked at a central server along with container installation location details to facilitate subsequent machine learning classification for each type of installation. This data may preferably be captured initially using a field commissioning mobile application and ongoing through a central server connection to the controller 106. According to further preferred embodiments, machine learning may preferably be used to determine many important characteristics of the asset and cargo state (e.g., load status, load type, damage and intrusion) without human intervention.

As discussed above, the present invention may also preferably include a BLE transceiver 135 which may include a BLE antenna 130. According to a preferred embodiment, the BLE antenna 130 may be an inverted F antenna and may incorporate a BLE booster ring 124. The BLE booster ring 124 may preferably surround the lens 110 and act to preferentially transmit and receive BLE transmissions to/from the interior of a given container.

The circuit board 132 may preferably further include an accelerometer monitored by the controller 137. This may preferably allow the orientation (e.g., the wall or roof mounting of the sensor) to be measured in the field. This can be used to validate field commissioning data. Furthermore, the accelerometer can provide dynamic position information if installed to a dynamic structure such as a roll door. According to this embodiment, if mounted to the roll door, the controller 137 may preferably monitor the accelerometer to determine the door status/position. Based on the current door position/imaging device 100 orientation, selected IR LED light sources may be adjusted to selectively provide directed lighting. For example, when an exemplary roll door is up/open, the imaging device may use a roof mount IR LED profile and may preferentially use a first IR LED 120B to direct IR light to the nose of the asset.

Alternatively, when the roll door is down/closed, the first IR LED 122 and/or additional IR LED sources 120A, 120B may be selectively used to direct IR light to the nose of the asset or to another area of focus.

Figure 11B:
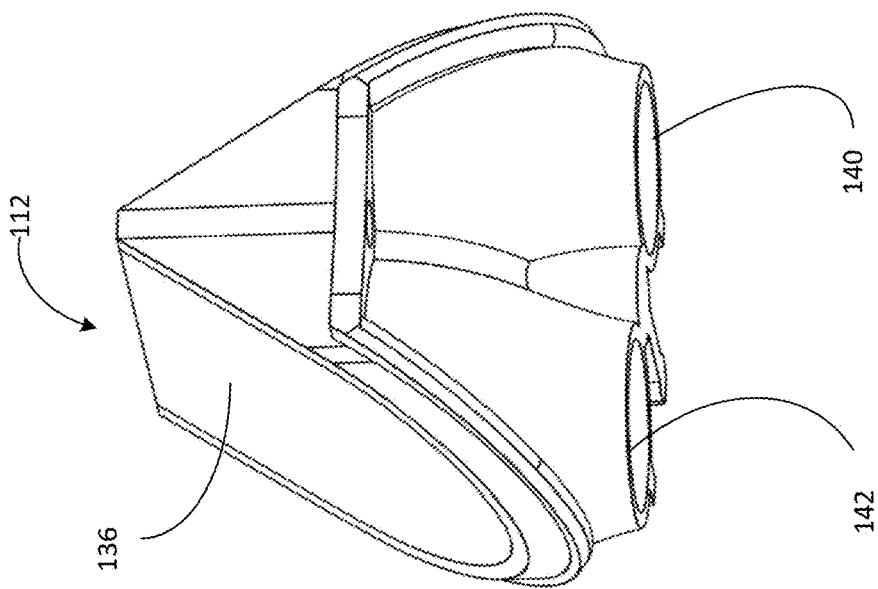
FIGS. 11A and 11B are perspective views of an exemplary light guide in accordance with aspects of the present invention.
Figure 11A:
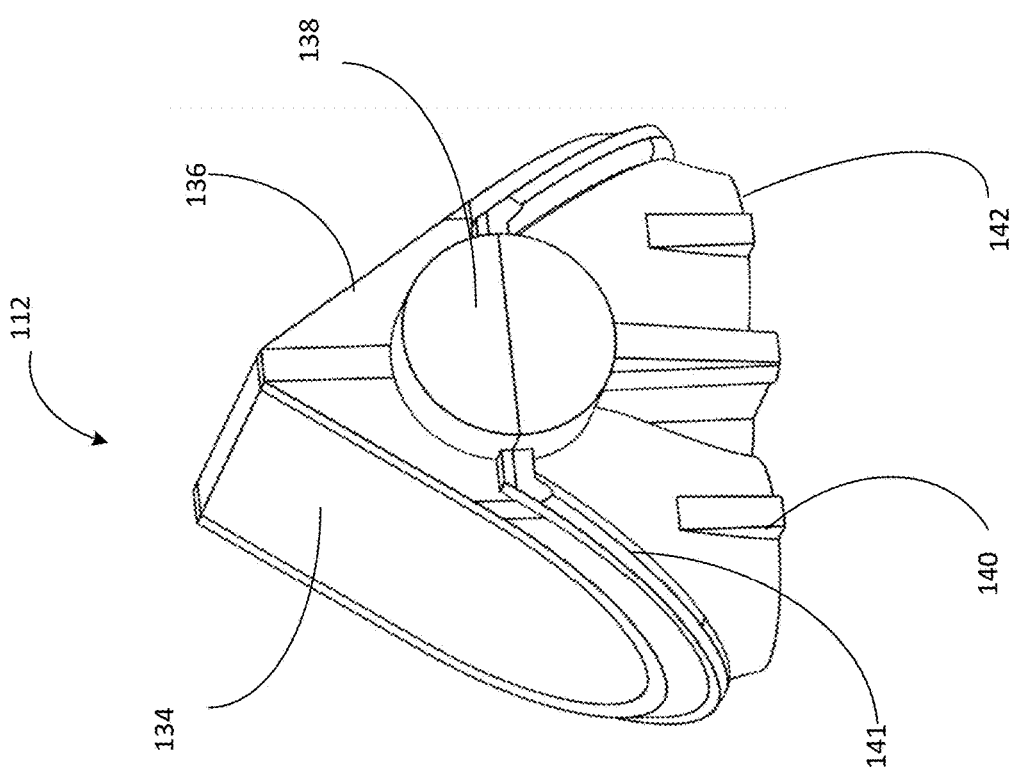
Figure 12B:
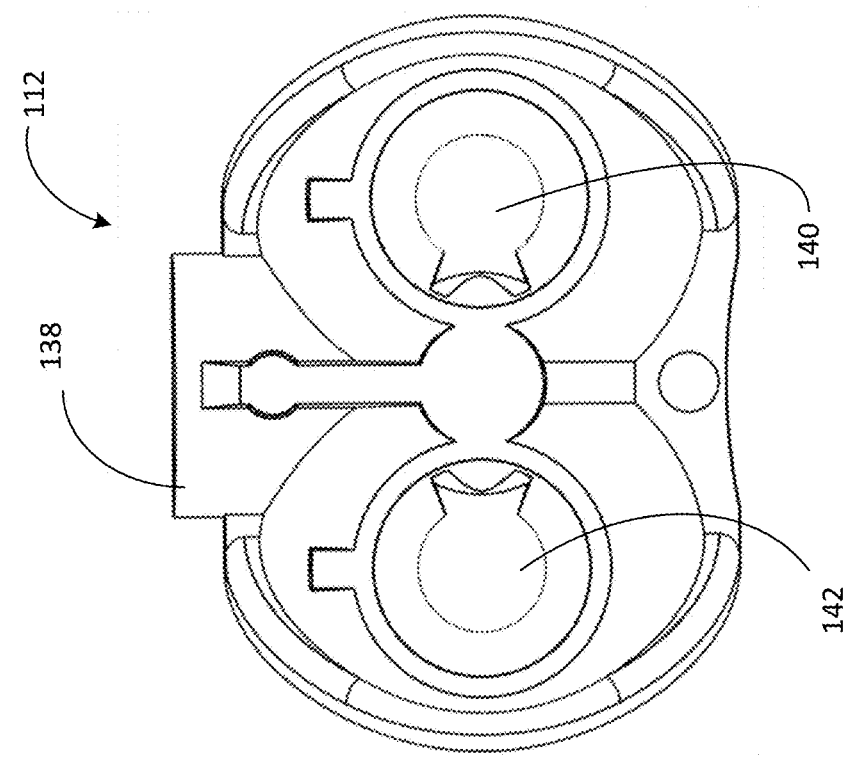
FIGS. 12A and 12B are top and bottom views of the exemplary light guide shown in FIG. 11A.
Figure 12A:
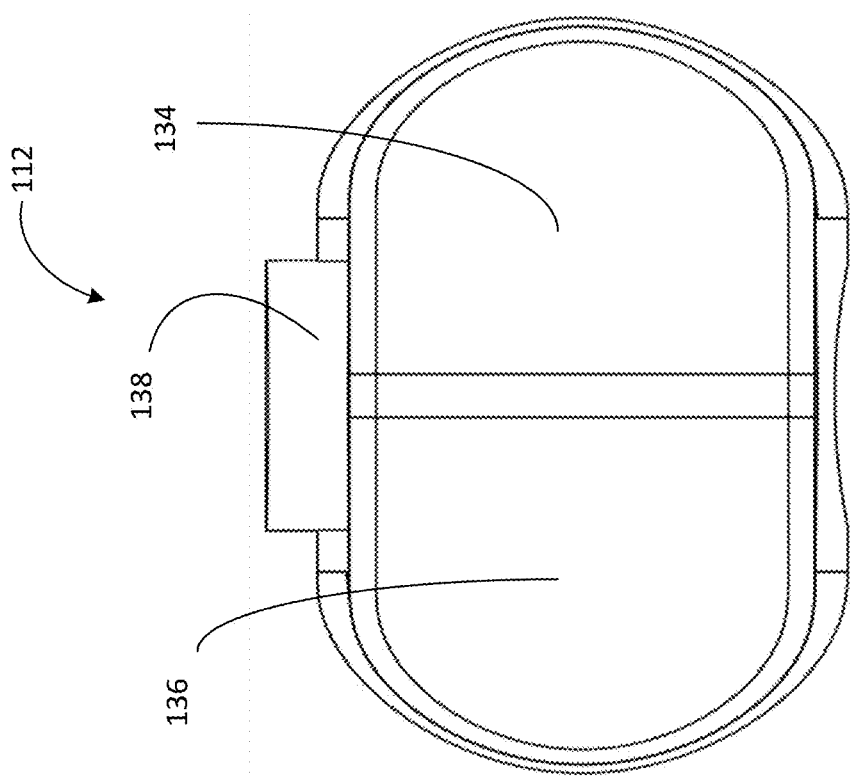

With reference now to FIGS. 11A-14, exemplary light guides 112, 114 for use with the present invention shall now be further discussed. An exemplary light guide 112 is shown in FIGS. 11A-12B. As shown in FIG. 11A, the exemplary light guide 112 may preferably include two light channels 140, 142 for receiving and directing light from respective IR light sources 120A and 120B to different areas of a given container interior. As shown in FIGS. 11A and 11B, the exemplary light guide 112 includes a first face 134 and a second face 136 for directing light out from the light guide 112. Further, a retention wall 141 is shown which assures mechanical bond for ingress protection between the light guide 112 and housing 108. A gate vestige 138 is also shown. FIGS. 12A and 12B provide additional top and bottom views of the exemplary light guide 112.

Figure 13B:
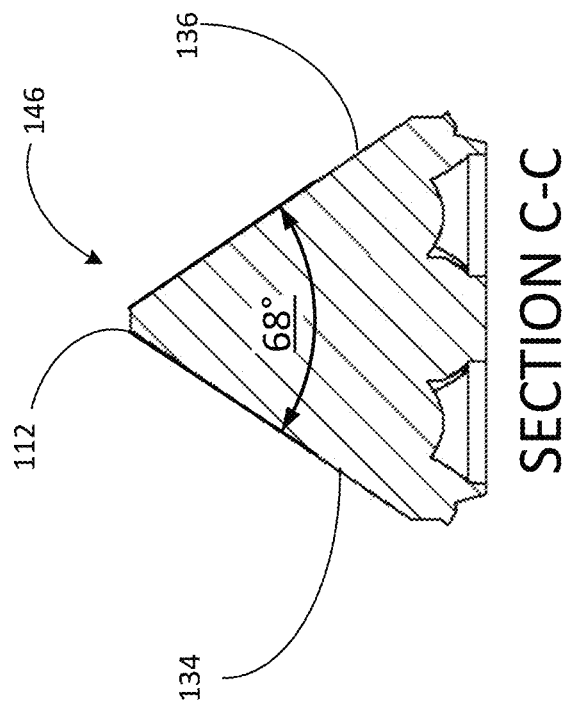
FIG. 13B is a cross-sectional view of the light guide shown in FIG. 13A taken along the line C-C.
Figure 13A:
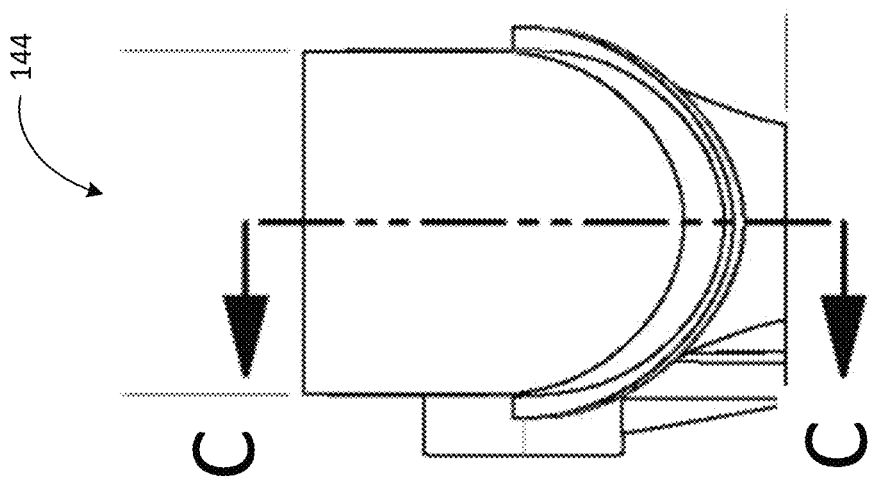
FIG. 13A is a side view of the exemplary light guide shown in FIG. 11A.

With reference now to FIG. 13A, a side view 144 of the exemplary light guide 112 is shown. FIG. 13B provides a further cross-sectional view 146 of the light guide 112 taken along the line C-C. Preferably, the internal angle between the first face 134 and the second face 136 may be in the range of 60-85°. According to a preferred embodiment, the internal angle between the first face 134 and the second face 136 may preferably be 68°.

According to a preferred embodiment, the light guide 112 may preferably be formed of an injected molded, clear polycarbonate such as Lexan 103R. Alternatively, any clear material with a similar index of refraction may be substituted. For example, other polycarbonates such as Lexan 925AU, Lexan 940A and/or Lexan 920A-116 may also be used. Regardless of the materials used, the faces 134, 136 of the light guide 112 may preferably be polished to a high-grade (e.g., GRADE 1, A).

Figure 14:
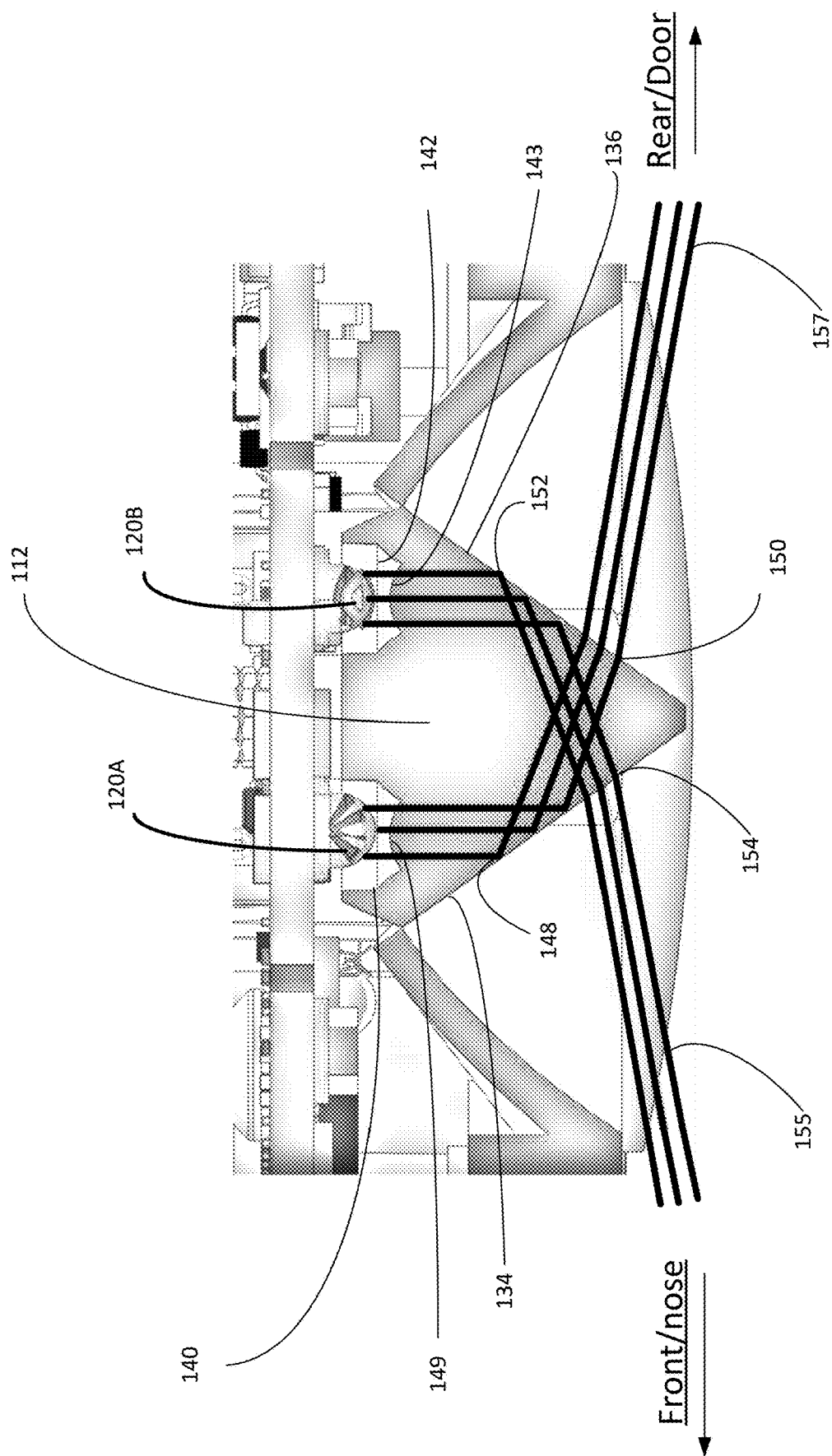
FIG. 14 is a schematic view of an exemplary light guide of the present invention used within an exemplary imaging device.

With reference now to FIG. 14, a schematic view of the exemplary light guide 112 is provided to further illustrate exemplary optical characteristics of the exemplary light guide 112. As shown, the first light channel 140 preferably includes a curved air-Polycarbonate (PC) interface 149. This first PC interface 149 preferably collimates the received IR light beam from the IR LED light source 120A for the beam <±30°, with the beam >±30° lost. According to alternative preferred embodiments, the first air-Polycarbonate (PC) interface may alternatively collimate the beam <±30-40°.

As further shown, the first face 134 is preferably angled to produce a first angle of incidence 148 which is sufficient for Total Internal Reflection (TIR) at the first face 134 (i.e., the folding surface). Thereafter, the first beam is preferably deviated upward at the PC-air exiting surface 150 to produce an exit angle that is approximately 15° from horizontal. This first beam 157 may, for example, be projected towards the rear of a given cargo container.

As further shown in FIG. 14, the second light channel 142 preferably includes a curved air-Polycarbonate (PC) interface 143. This second PC interface 143 preferably collimates the received IR light beam from the IR LED light source 120B for the beam <±30°, with the beam >±30° lost. According to alternative preferred embodiments, the second air-PC interface 143 may alternatively collimate the beam <±30-40°. The second face 136 is preferably angled to produce a second angle of incidence 152 which is sufficient for Total Internal Reflection (TIR) at the second face 136 (i.e., the second folding surface). Thereafter, the second beam 155 is preferably deviated upward at the PC-air exiting surface 154 to produce an exit angle that is approximately 15° from horizontal. This second beam 155 may, for example, be projected towards the front/nose of a cargo container.

According to an exemplary embodiment, if the installation location distance from the front/nose is farther from the rear/door, the IR LED light source 120B may preferably be set to full power and the IR LED light source 120B may be set to half-power or OFF. Additionally, if more light is required, the IR LED light source 122 may be set to half power. According to a further preferred embodiment, for a door mounted imaging device 109, IR LED light source 122 may alternatively be set to full power.

Figure 15:
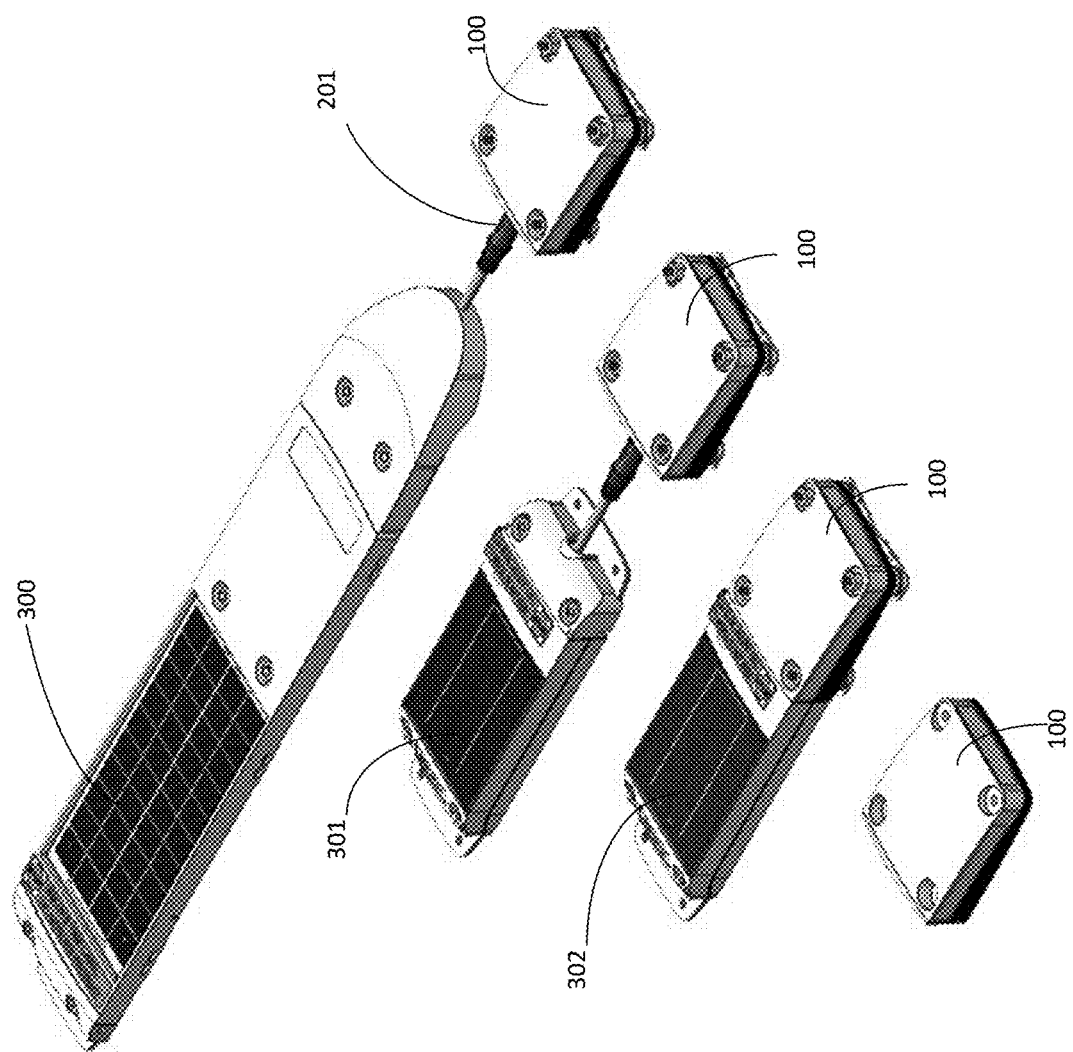
FIG. 15 provides an illustration of a first set of exemplary imaging device configurations and arrangements in accordance with aspects of the present invention.

As shown in FIG. 15, an exemplary imaging device 100 may preferably be powered from and/or communicate (e.g., over RS-485 or the like) with one or more connected devices 300, 301, 302. According to further preferred embodiments, any such connected devices 300, 301, 302 may also be used to power and communicate with multiple cameras (e.g., such as by using multi-drop RS485 cabling or the like). As shown in FIG. 15, the imaging device 100 may connect to a combined solar/communications module 300 via cable connector 201 (as discussed further below). Alternatively, the imaging device 100 may be connected to a dedicated solar module 301 via the cable connector 201. As further shown, the imaging device 100 may alternatively be directly connected to a solar module 302 or the like (as discussed further below) and/or may function alone with a direct wired connection or limited internal battery.

Figure 16:
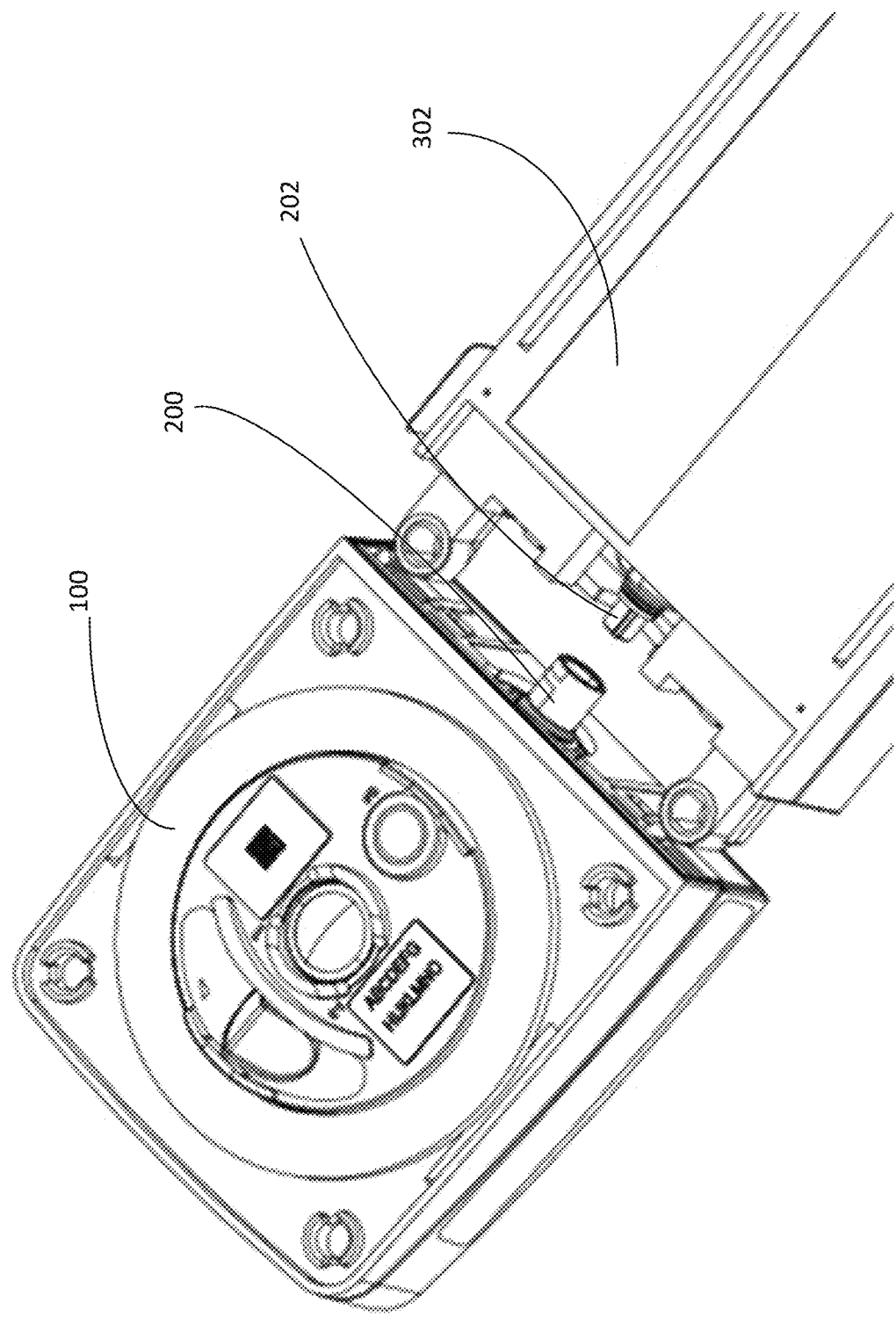
FIG. 16 illustrates a first exemplary imaging device connection in accordance with the present invention.
Figure 17:
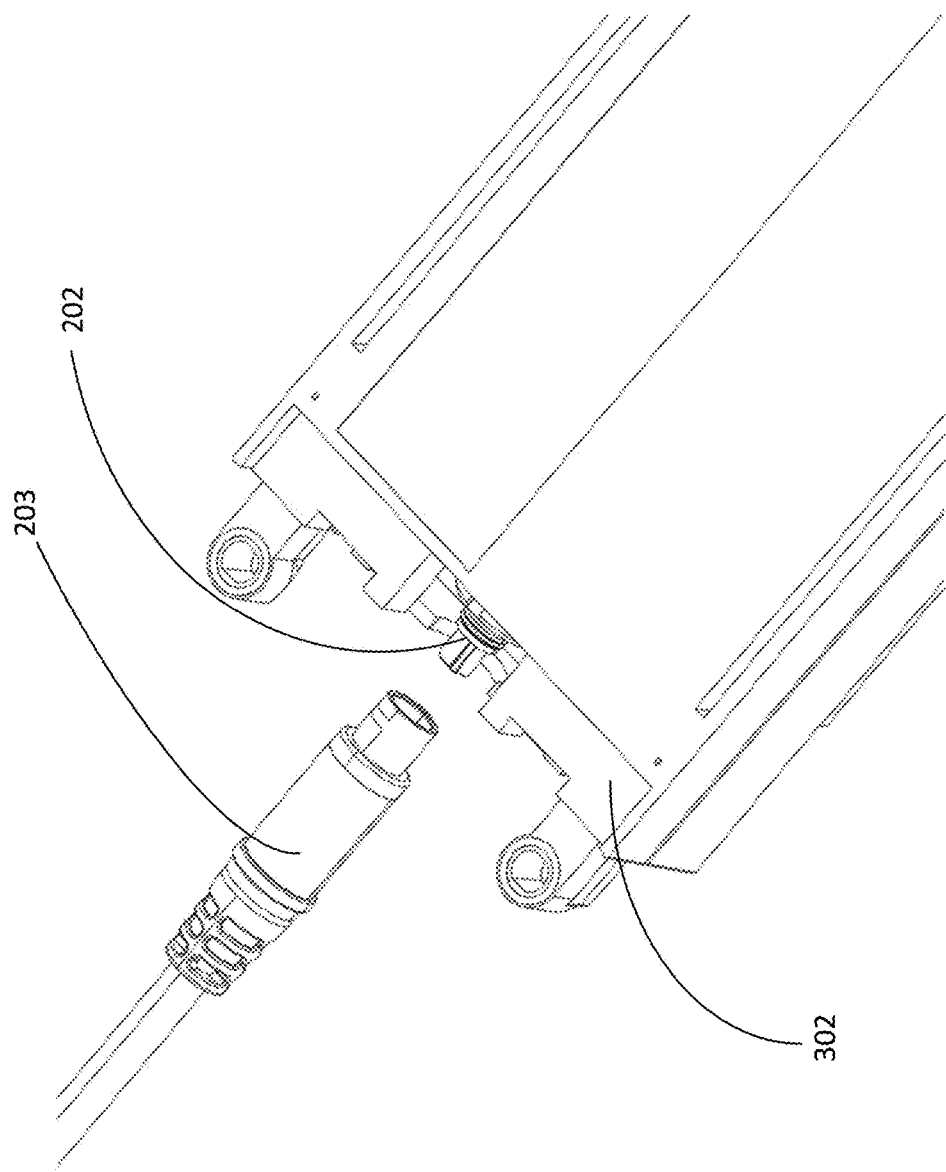
FIG. 17 illustrates a second exemplary imaging device connection in accordance with the present invention.
Figure 18:
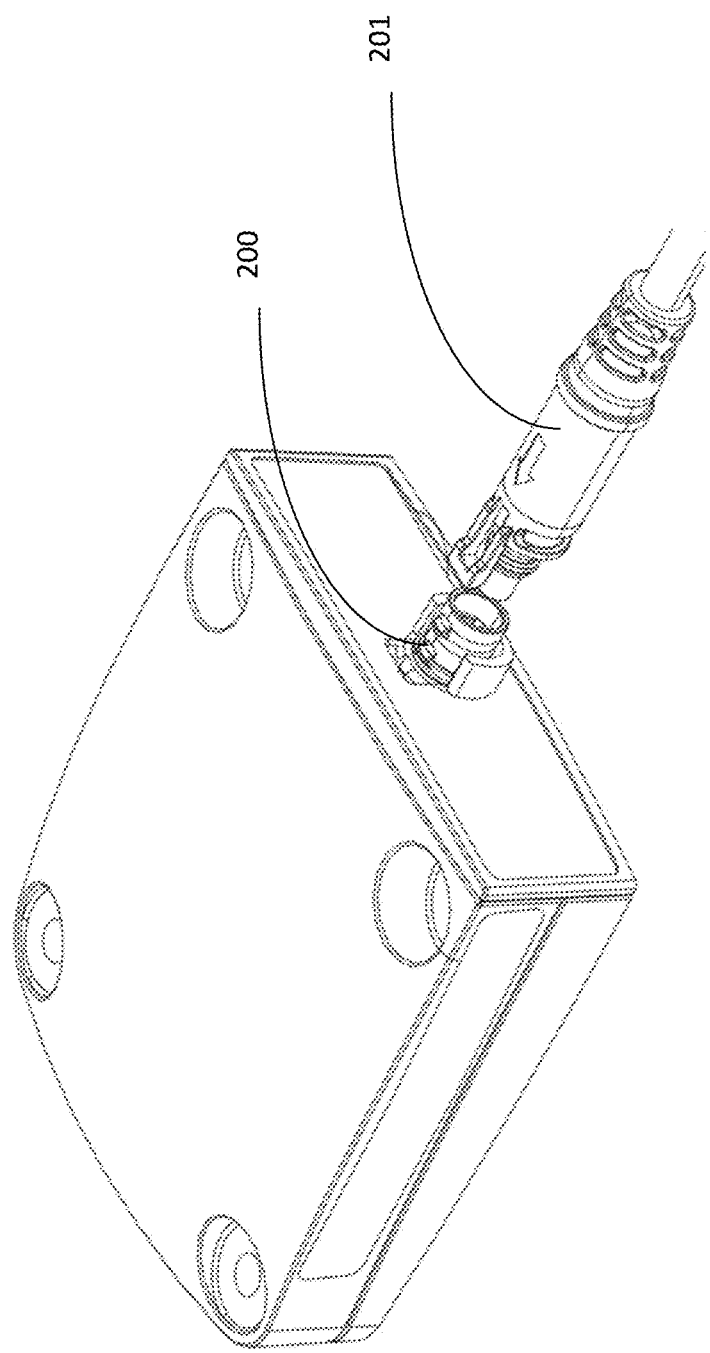
FIG. 18 illustrates a third exemplary imaging device connection in accordance with the present invention.
Figure 19:
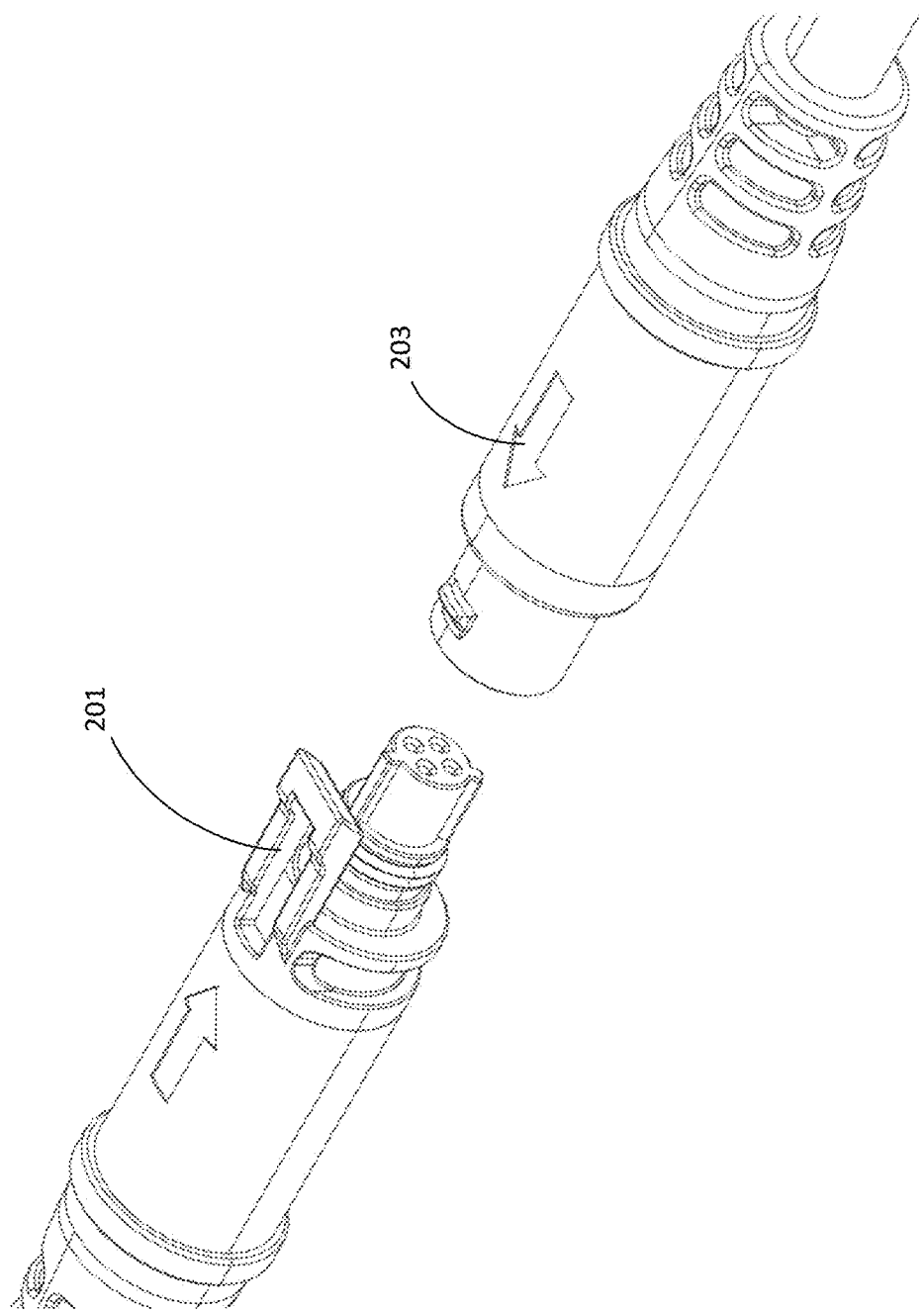
FIG. 19 illustrates a fourth exemplary imaging device connection in accordance with the present invention.

Referring now to FIGS. 16-19, an exemplary connector solution is shown which allows the imaging device 100 and the solar power module 302 (or other modules) to be directly mated together or to be mated via cable connections. Specifically, a first embodiment is shown providing a male-pin panel connector 200 which mates with both a female-socket cable connector (201) (as shown in FIG. 18) and a female-socket panel connector (202) (as shown in FIG. 16). Additionally, the female-socket panel connector (202) as shown preferably mates with both a male-pin cable connector (203) (as shown in FIG. 17) and a male-pin panel connector 200 (as shown in FIG. 16). Lastly, the female-socket cable connector (201) of the present invention may preferably be further connected to a male-pin cable connector (203) (as shown in FIG. 19), which may preferably assist in connections to more complex break-out harnesses for devices of the present invention.

The present invention has been disclosed above with reference to several examples. These examples are not intended to be limiting. Instead, the scope of the present invention should be determined purely by the terms of the appended claims and their legal equivalents.

What is claimed is:

1. An imaging device to provide optical sensing within the interior of a closed cargo container, the imaging device comprising:
    an outer housing enclosing one or more internal elements of the imaging device;
    a central lens, wherein the central lens comprises a fish-eye lens;
    a light guide body; wherein the light guide body comprises:
    a first light channel configured to receive and direct a first infrared light beam from a first infrared light source, and
    a second light channel configured to receive and direct a second infrared light beam from a second infrared light source;
    wherein the first light channel comprises a first curved air-polycarbonate interface that collimates the first light beam from the first infrared light source;
    wherein the second light channel comprises a second curved air-polycarbonate interface that collimates the second light beam from the second infrared light source.

2. The imaging device of claim 1, wherein the first curved air-polycarbonate interface is configured to colliminate the first received infrared light beam to a beam divergence of less than +30°.

3. The imaging device of claim 1, wherein the first curved air-polycarbonate interface is configured to colliminate the first received infrared light beam to a beam divergence of less than +40°.

4. The imaging device of claim 3, wherein the light guide body further comprises: a gate vestige formed on the light guide body and configured to facilitate alignment of the light guide with an associated housing.

5. The imaging device of claim 1, wherein the light guide body further comprises:
    a folding surface defined by a first face, the first face being angled relative to the first light channel to produce a first angle of incidence that is sufficient to cause total internal reflection of the first infrared light beam.

6. The imaging device of claim 5, wherein the first face is arranged relative to the first light channel to create an exit angle of 15° from horizontal for the first received infrared light beam.

7. The imaging device of claim 1, wherein the central lens is encircled by a sealing flange; wherein the sealing flange is attached to the housing of the imaging device.

8. The imaging device of claim 7, wherein the imaging device further comprises a first BLE arrangement.

9. The imaging device of claim 8, wherein the first BLE arrangement comprises: a BLE transmitter; a BLE antenna; and a BLE booster ring.

10. The imaging device of claim 9, wherein the BLE antenna comprises an inverted F antenna.

11. The imaging device of claim 10, wherein the BLE booster ring comprises a circular ring that surrounds the central lens.

12. The imaging device of claim 11, wherein the BLE booster ring is configured to preferentially transmit and receive BLE transmissions to and from within the interior of the closed cargo container.

13. The imaging device of claim 12, wherein the imaging device comprises a first connector, wherein the first connector is configured to connect to a second connector; wherein the first connector is further configured to attach to a connecting device.

* * * * *